Patented Sept. 21, 1954

2,689,853

UNITED STATES PATENT OFFICE 2,689,853

CERTAIN 1,2-DISUBSTITUTED BENZIMIDAZOLES AND PROCESS

Martin Schenck, Berlin, and Wilhelm Heinz, Braunschweig, Germany, assignors to Schering A. G., Berlin, Germany, a corporation of Germany No Drawing. Application February 15, 1951, Serial No. 211,198

Claims priority, application Germany March 3, 1950

11 Claims. (Cl. 260—309.2)

This invention relates to the manufacture of new derivatives of imidazole.

It is known that derivatives of benzimidazole which contain in 1-position an alkylaminoalkyl residue and in 2-position a hydrocarbon residue (J. Am. Chem. Soc. 71, 2035, 1949) only possess a spasmolytic effect, especially on the smooth musculature of warm-blooded animals which has been contracted by means of histamine, which is so small that it is without importance for practical therapy. The same is true of benzimidazole derivatives which contain in 2-position a basically substituted alkyl residue but are unsubstituted in 1-position, that is to say contain only a hydrogen atom in this position (J. Org. Chemistry 6, 25–35, Jan. 1941, Philadelphia).

The present invention is based on the surprising observation that condensed imidazole derivatives, which contain in 1-position an aralkyl, aryl or heterocyclic residue or heterocyclically substituted alkyl residue, and in 2-position an amino group or an aliphatic, hydroaromatic or heterocyclic residue which contains at least one basic nitrogen atom, possess interesting pharmacological effects for example, together with very low toxicity, a spasmolytic effect upon the smooth musculature of warm-blooded animals. Some of them equal in effect the best antiallergic compounds used in practice and by reference to the "Index," that is to say the ratio of the effective dose to the minimum lethal dose, even far surpass them. The new compounds are further distinguished by a particularly strong persistence which is of advantage for a protracted effect. The residues present in 2-position, when they contain straight or branched carbon chains, may also be interrupted once or several times by hetero atoms. The compounds are in addition condensed through the imidazole ring in 4:5-position with an unsubstituted or substituted aromatic, hydroaromatic or heterocyclic ring system.

For comparison with known compounds it may be mentioned that for example for the hydrochloride of 1-benzyl-2-(dimethylaminomethyl)-benzimidazole in the case of white mice the minimum lethal dose is 10 mg. per 20 grams of mouse, whereas 0.6 mg. of the substance is sufficient in the case of guinea pigs to prevent the incidence of bronchial asthma from histamine spray. On the other head for example the corresponding doses of the hydrochloride of 2-phenyl-benzylaminomethyl-imidazoline are 3.36 mg. and 1.05 mg., respectively, so that the "Index" in the case of the hydrochloride of 1-benzyl-2-(dimethyl-amino methyl)benzimidazole is 1:17 but in the case of the hydrochloride of 2-phenyl benzyl amino methyl imidazoline only 1:3.2 1-(p-chlorobenzyl - 2 - pyrrolidylmethylbenzimidazole exhibits an effect in the asthma test which is about 50 times that set forth above. The present invention therefore primarily relates to imidazole compounds and their salts which compounds contain in 1-position an unsubstituted or substituted aryl, aralkyl, or heterocyclic residue or a heterocyclically substituted alkyl residue and in 2-position one or more N-atoms of primary, secondary or tertiary nature which are linked to the imidazole nucleus, either by a straight or branched hydrocarbon chain which is uninterrupted or interrupted once or several times by hetero-atoms, or alternatively by a hydroaromatic residue or through a heterocyclic residue, and in which compounds the imidazole nucleus is condensed in 4:5-position with an unsubstituted or substituted aromatic, hydroaromatic or heterocyclic ring system.

In particular the invention relates to benzimidazole compounds and their salts which compounds contain in 1-position and unsubstituted or substituted aryl, aralkyl or heterocyclic residue or a heterocyclically substituted alkyl residue and in 2-position an aliphatic, hydroaromatic or heterocyclic residue which contains at least one basic nitrogen atom.

Specific compounds to which the invention relates are 1-benzyl-2-dimethylaminomethyl-benzimidazole, 1-benzyl-2-diethylaminomethyl-benzimidazole, 1 - benzyl - 2 - pyrrolidylmethyl-benzimidazole, 1 - benzyl-2-n-butylaminomethyl-benzimidazole, 1 - benzyl-2-(dimethylamino-ethyl-methylamino - methyl)-benzimidazole, 1-p-chlorobenzyl - 2 - N - pyrrolidylmethyl-benzimidazole, 1 - p-chlorobenzyl-2-dimethylaminomethyl - benzimidazole and 1 - anisidyl-2-pyrrolidylmethyl-benzimidazole and their salts.

The invention also relates to methods of manufacture of the imidazole compounds concerned as hereinafter set forth.

For the manufacture of these imidazole derivatives basically substituted in 2-position described in more detail above, the customary methods of preparation can be used. As starting materials are used compounds of the general formula

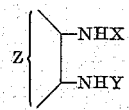

wherein X is hydrogen or an unsubstituted or substituted aryl-, aralkyl- or heterocyclic residue or a heterocyclically substituted alkyl residue or a residue convertible into these residues, Y is hydrogen or a substituted acyl residue, which is substituted by an unsubstituted or substituted primary, secondary or tertiary amino group or a group convertible into an amino group and Z is an unsubstituted or substituted isocyclic or heterocyclic ring system. These compounds are transformed into the imidazole compounds by known methods. For the manufacture of these compounds and the transformation into the imidazole compounds it is possible to employ as starting materials for example aromatic, hydroaromatic or heterocyclic, compounds or compounds containing a heterocyclic ring, two adjacent carbon atoms of said compounds being substituted by a halogen atom and a nitro group. By the method customary for this purpose these o-halogen-nitrocompounds may be reacted with aminoaryl compounds (for example aniline, toluidine etc.), aminoaralkyl compounds (for example benzylamine) or aminosubstituted heterocyclic (as for example 2-(aminomethyl)-thienyl) compounds. Instead of o-nitro-halogen compounds also suitable esters of o-hydroxynitro compounds, as for example the p-toluene sulphonic acid esters, may be reacted with the amino compounds. Obviously this reaction can also be carried out with o-halogen nitro derivatives which may contain together with these two substituents any other suitable substituents, and likewise the aminoaryl-, aminoaralkyl- or amino - substituted heterocyclic compounds specified above for the reaction, may contain further substituents, advantageously halogen or alkyl or alkoxy residue etc.

The compounds produced in this manner now contain a nitro group in o-position to an alkyl-, amino-, arylamino- or heterocyclically substituted amino-group, and in them by methods customary for the purpose the nitro group is converted into the amino groups.

For the preparation of the desired imidazole derivatives basically substituted in 2-position it is possible to proceed in such a manner that by the methods customary for the purpose the o-diamino-compounds thus produced are subjected to ring closure to the corresponding imidazole compounds by reacting them with such basically substituted aliphatic, hydroaromatic or heterocyclic compounds as also contain reactive substituents suitable for ring closure, as for example carboxyl, acid chloride, acid anhydride, acid ester, aldehyde, acid amide or amidine groups etc.

It is however also possible to use for the reaction aliphatic, hydroaromatic or heterocyclic compounds which contain together with a substituent suitable for ring closure, in addition another group which may be replaced by reaction with ammonia or primary or secondary amines or diamines etc., as for example halogen atoms, imido-ethers etc., so that in this manner the imidazole ring is first formed and then one or more amine residue are attached, in a second reaction, to the 2-position of the imidazole compound already produced.

It is however also possible to employ as starting materials o-nitroamino compounds. With the amino group there are linked by customary methods aryl, aralkyl or heterocyclic residues, or residues containing a heterocyclic ring, for example by means of the corresponding halogen compounds. Obviously in this case also both starting material and linking components can, as described above, if desired contain substituents of various kinds. The amino-substituted o-nitro-compounds produced are now further reacted in the manner described above to form the desired end products.

Furthermore it is obviously also possible to employ o-diamino-compounds as starting materials for the synthesis of such imidazole derivatives and to convert them by methods customary for this purpose into such o-diamino compounds as are substituted only in one amino-group in the above described manner by aryl, aralkyl or heterocyclic residues. These can then be converted by the methods of ring closure set forth above into the corresponding imidazole derivatives.

It is also possible to arrive at such 1:2-substituted imidazole derivatives by first converting the o-diamino-compound according to the methods specified above into 2-substituted imidazole derivatives and then subsequently to replace the hydrogen attached to the 1-nitrogen by aryl, aralkyl or heterocyclic residues or residues containing a heterocyclic ring.

For the production of the compounds according to the invention it is also possible to proceed in the following manner: o-nitroamino-compounds are used as starting materials and these are condensed with acid halides to the corresponding N-acyl-compounds. Thereupon, after reduction of the nitro group to the amino group, the ring closure to the imidazole derivatives is carried out and then the keto group of the acyl residue is converted into the $CH_2$ group.

The following examples illustrate the invention:

Example 1

23 grams of N-benzyl-2-nitroaniline (produced for example by the method of Kehrmann and Tichwinsky (Annalen 290, 293) from o-nitrochlorobenzene and benzylamine) are mixed with 0.315 mol of stannous chloride, 95 cc. of concentrated hydrochloric acid introduced and the mixture maintained hot for 15 minutes in a steam bath. After cooling the whole is treated with 390 cc. of 50 per cent. caustic soda solution and the o-amino-N-benzyl-aniline, which separates in oily form in a quantity which is 94 per cent. of the theoretical, is isolated while still warm, boiled in ligroin with the addition of a little carbon, filtered and crystallised. The base is obtained in the form of white crystals of M. P. 54° C.

The imidazole ring closure is carried out by boiling in 5 N-hydrochloric acid with monochloracetic acid: Into a solution of 60 grams of monochloracetic acid in 400 cc. of 5 N-hydrochloric acid are introduced 80 grams of o-aminobenzyl-aniline and the whole is boiled under reflux for 3½ hours. On cooling with ice 66 per cent. of the theoretical quantity of 1-benzyl-2-chloromethyl - benzimidazole - hydrochloride separates out in crystalline form. A further 20 per cent. is obtained from the mother liquor by neutralisation of the free hydrochloric acid and the residual monochloracetic acid contained therein. The hydrochloride when recrystallized from dioxane sinters at 165° C., it is difficulty soluble in water, easily soluble in alcohol and produces serious inflammation in contact with the skin. The free base has a melting point of 111° C. (from ligroin), it is difficultly soluble in alcohol, easily soluble in benzene and begins to decompose at 140° C.

26.5 grams of 1-benzyl-2-chloromethyl-benzimidazole base are stirred with 25 grams of benzene and subjected to the addition of 100 grams of dimethylamine dissolved in 200 cc. of benzene, whereby slight heating takes place. After heating to boiling under reflux for some time, the solution is filtered for the removal of the residual dimethylamine and the dimethylamine hydrochloride formed and extracted by shaking with water. On extraction of the benzene solution with dilute hydrochloric acid there is then obtained the hydrochloride of 1-benzyl-2-dimethyl-aminomethyl-benzimidazole in the form of rosettes which can be recrystallised from aqueous acetone or from butanol. The melting point, according to the rate of heating, lies between 210 and 214° C. At this temperature decomposition may easily take place with splitting off of dimethylamine.

In an analogous manner by reaction of 1-benzyl-2-chloromethyl-benzimidazole with diethylamine or pyrrolidine or monobutylamine (6 mol) or dimethylaminoethyl-methylamine the hydrochlorides are obtained of 1-benzyl-2-diethyl-aminomethyl-benzimidazole, plate of M. P. 144–146° C.; 1-benzyl-2-pyrrolidylmethyl-benzimidazole, tablets or needles of M. P. 192–193° C.; 1-benzyl - 2 - n - butylaminomethyl-benzimidazole, tablets of M. P. 194–196° C.; 1-benzyl-2-dimethlyaminoethyl - methylamino - methyl-benzimidazole, M. P. of picrate 182° C.

Example 2

25.6 ($\frac{1}{10}$ mol) grams of 1-benzyl-2-chloromethyl-benzimidazole in 25 grams of toluene are boiled with a solution of 17 grams of pyrrolidine in 17 grams of toluene for 3 hours under reflux. After cooling is separated of hydrochloride of pyrrolidine and the solution of toluene is extracted by shaking with water and after with a little quantity (ca. $\frac{1}{200}$ mol) of dilute hydrochloric acid. By further extraction with dilute hydrochloric acid is obtained the hydrochloride of 1-benzyl-2-N-pyrrolidylmethyl-benzimidazole, which can be recrystallised from acetone with a little quantity of water or from butanol. The hydrochloride is easily soluble in alcohol, very difficultly in boiling benzene, plates or needles of M. P. 192–193° C.

Example 3

From 13.1 grams of N-p-chlorobenzyl-2-nitroaniline (M. P. 110°, obtained in the form of orange-red needles, in an analogous manner to that given in Example 1 for benzyl-2-nitraniline, from o-nitrochlorobenzene and p-chlorobenzylamine by reaction for 3 hours at 150° C.) by reduction with Raney-nickel and hydrogen, in which reaction the substance may be suspended in methanol or dissolved in methanol-ethyl acetate, at normal pressure and at about 40° C. with combination of the theoretical quantity of hydrogen, 12.2 grams are obtained of o-amino-N-p-chlorobenzylaniline, which after recrystallisation from aqueous methanol has a M. P. of 90° C.

8 grams of o-amino-N-p-chlorobenzylaniline and 2.8 grams of pyridine are dissolved in dry ether and reacted with an ethereal solution of 3.9 grams of chloracetyl chloride with cooling in a mixture of ice and common salt. 8 grams of N-p - chlorobenzyl - N'-chloracetyl-o-phenylene diamine are obtained which can be worked up in the form of the crude product and, in the slightly coloured form, has a M. P. of 130° C.

7.6 grams of this compound are boiled with 3.9 grams of pyrrolidine in 70 cc. of toluene for some hours under reflux. After extraction by shaking with water and treatment with hydrochloric acid the hydrochloride is produced of N-p - chlorobenzyl - N' - pyrrolidylacetyl-o-phenylene diamine together with some 1-p-chlorobenzyl - 2 - N - pyrrolidylmethyl-benzimidazole. The former, after recrystallisation from butanol, melts with foaming at 205° C., the latter, after recrystallisation from butanol melts at 239–241° C., and is in the form of white microscopic rods. Boiling in nitrobenzene converts the former compound into the latter.

The N - p - chlorbenzyl-N'-pyrrolidylacetyl-o-phenylenediamine can also be obtained by way of the Schiff's base of p-chlorobenzaldehyde with N - pyrrolidyl - acetyl-o-phenylene diamine and subsequent reduction. 4.4 grams of N-chloracetyl-o-nitraniline (Berichte 48, 1004, 1008) are converted with 3.2 grams of pyrrolidine in 16 cc. of toluene by boiling under reflux, into 4.4 grams of N-pyrrolidyl-acetyl-o-nitraniline of M. P. 63–64° C. 4.2 grams of this compound are suspended in 28 cc. of methanol and catalytically reduced with Raney nickel. N-pyrrolidylacetyl-o-phenylene diamine is produced, occurring, when recrystallised from alcohol, in a quantity of 2.3 grams and having the M. P. 147.5–148° C. For the preparation of the Schiff's base this compound need not be isolated, but the methyl alcoholic solution produced in the reduction can be reacted immediately with the molecular quantity of chloro-benzaldehyde in the cold to form p-chlorobenzyl - N - pyrrolidyl - o-phenylene-diamine.

If the N-p-chlorobenzyl - N' - chloroacetyl-o-phenylene diamine is reacted with other nitrogen bases as for example with dimethylamine, there are obtained as end products the corresponding benzimidazole derivatives such as the hydrochloride of 1-p-chlorobenzyl-2-dimethyl-aminomethyl-benzimidazole which occurs in white needles of M. P. 202.5–203.5° C.

Example 4

22.5 grams of o-nitrochlorobenzene are reacted with 49.3 grams of p-anisidine and 11.7 grams of sodium acetate by heating for 14 hours to 210–215° C. From ethanol 24.4 grams of o-nitro-p-anisidyl-aniline crystallise in the form of red crystals of M. P. 86–87° C.

22 grams of o-nitro-p-anisidylaniline in 100 cc. of methanol, 100 cc. of ethyl acetate and 5 cc. of water are reduced with Raney nickel and hydrogen at room temperature. 19.1 grams are produced of o-amino-p-anisidyl-aniline which can be worked up either immediately or after recrystallisation form ligroin, from which pale pink coloured small scales of M. P. 56–57° C. separate.

15 grams of o-amino-p-anisidyl-aniline are boiled under reflux for 4 hours with 10 grams of monochloracetic acid and 70 cc. of 5-n-hydrochloric acid. After cooling, the hydrochloride of 1-anisidyl-2-chloromethyl-benzimidazole, which separates in oily form, is converted with bicarbonate into the base (17.2 grams) and the latter obtained from methanol with the addition of a little carbon in the form of a light violet powder of M. P. 130–135° C. 2 grams of 1-anisidyl-2-chloromethyl-benzimidazole are stirred with 2 cc. of benzene and heated with 1.3 grams of pyrrolidine for 2 hours on the water bath. After dilution with benzene and extracting by shaking with water the benzene is evaporated. The residue when recrystallised from ligroin gives 0.7 gram of needles of 1-anisidyl-2-pyrrolidylmethyl-benzimidazole of M. P. 110–112° C. which are easily soluble in ether, alcohol and benzene.

We claim:

1. A compound selected from the group consisting of a benzimidazole compound and a salt thereof with acids substantially non-toxic to the human body, said benzimidazole compound corresponding to the formula

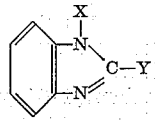

wherein X is a substituent selected from the group consisting of the phenyl radical, the benzyl radical, the chloro benzyl radical, a phenyl radical substituted by a lower alkyl radical, a phenyl radical substituted by a lower alkoxy group, and a lower alkyl thienyl radical, and Y is a lower alkyl residue selected from the group consisting of a lower alkyl radical substituted by a mono-lower alkyl amino group, a di-lower alkylamino group, and the N-pyrrolidino group.

2. In a process of producing benzimidazole compounds, the steps comprising condensing an o-phenylene diamine compound the one amino group of which is substituted by a substituent selected from the group consisting of the phenyl radical, the benzyl radical, the chloro benzyl radical, a phenyl radical substituted by a lower alkyl radical, a phenyl radical substituted by a lower alkoxy group, and a lower alkyl thienyl radical with a reactive monohalogenated lower aliphatic acid in the presence of a mineral acid condensing agent to cause ring closure and to form the benzimidazole ring, and reacting the resulting benzimidazole compound with an amine selected from the group consisting of a primary amine and a secondary amine.

3. As new compounds, the 1-benzyl-2-dialkylamino lower alkyl benzimidazoles.

4. 1-benzyl-2-dimethyl amino methyl benzimidazole.

5. 1-benzyl-2-dimethyl amino ethyl methyl amino methyl benzimidazole.

6. As new compounds, the 1-chloro benzyl-2-dialkyl amino lower alkyl benzimidazoles.

7. 1-p-chloro benzyl -2-dimethyl amino methyl benzimidazole.

8. As new compounds, the 1-benzyl-2-N-pyrrolidyl lower alkyl benzimidazoles.

9. 1-benzyl-2-N-pyrrolidyl methyl benzimidazole.

10. As new compounds, the 1-chloro benzyl-2-N-pyrrolidyl lower alkyl benzimidazoles.

11. 1-p-chloro benzyl-2-N-pyrrolidyl methyl benzimidazole.

References Cited in the file of this patent

Wright, Jour. Amer. Chem. Society, vol. 71, pp. 2035–37.